(No Model.)
E. D. KNAP.
COMBINED CUT-OUT AND CORD ADJUSTER.
No. 520,318. Patented May 22, 1894.
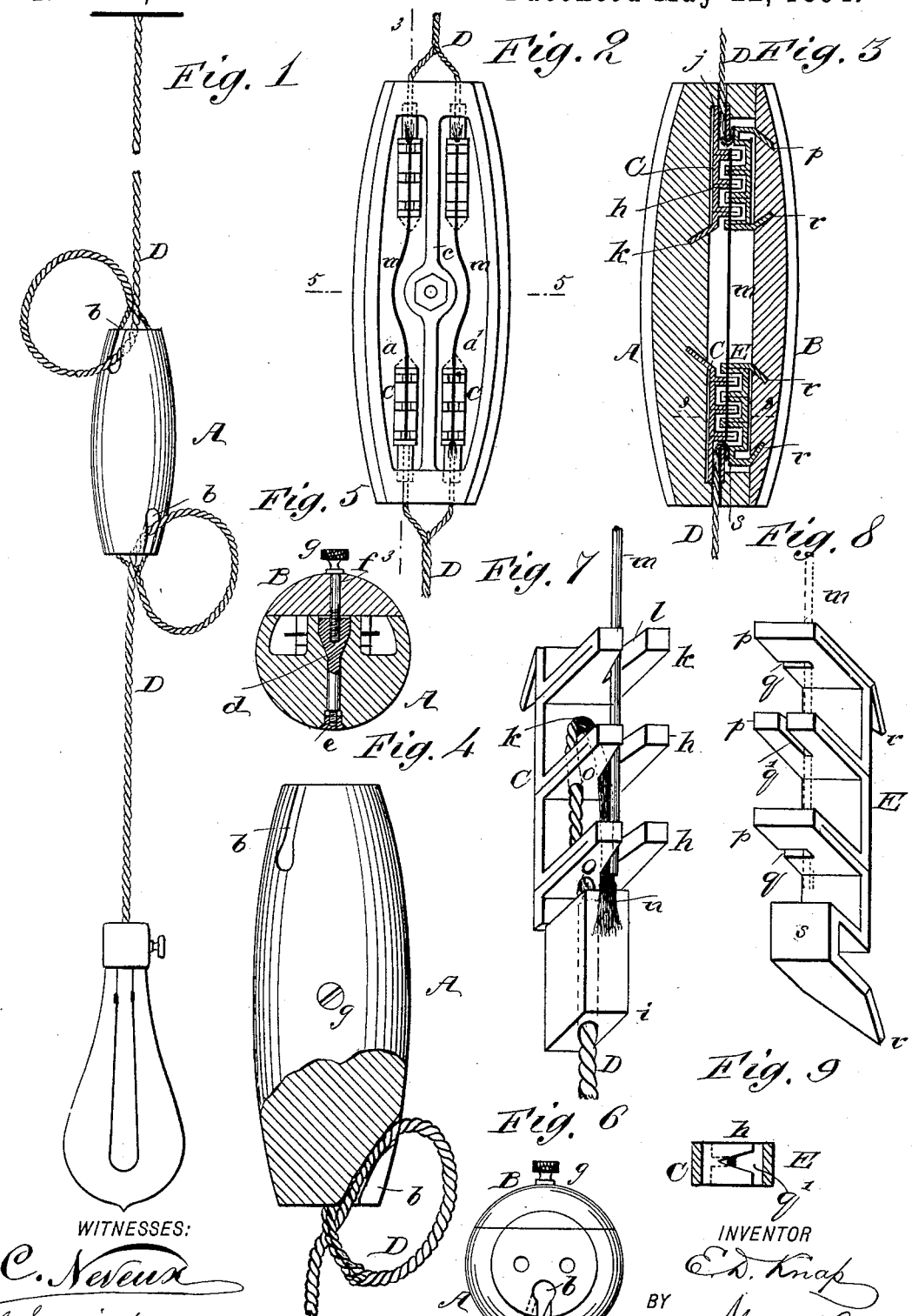
WITNESSES:
C. Neveux
C. Sedgwick
INVENTOR
E. D. Knap
BY Munn & Co.
ATTORNEYS.

UNITED STATES PATENT OFFICE.

EDGAR DAY KNAP, OF SCHENECTADY, NEW YORK.

COMBINED CUT-OUT AND CORD-ADJUSTER.

SPECIFICATION forming part of Letters Patent No. 520,318, dated May 22, 1894.

Application filed November 23, 1893. Serial No. 491,733. (No model.)

*To all whom it may concern:*

Be it known that I, EDGAR DAY KNAP, of Schenectady, in the county of Schenectady and State of New York, have invented a new and Improved Combined Cut-Out and Cord-Adjuster, of which the following is a specification, reference being had to the annexed drawings, forming a part thereof, in which—

Figure 1 is a side elevation of my improved combined cut-out and cord adjuster. Fig. 2 is a side elevation, with the cover removed. Fig. 3 is a vertical longitudinal section on the line 3—3 in Fig. 2. Fig. 4 is a side elevation, partly in section, showing the details of the cord adjuster. Fig. 5 is a transverse section taken on line 5—5 in Fig. 2. Fig. 6 is an end elevation of the cut-out and cord adjuster. Fig. 7 is a perspective view of one of the contact pieces. Fig. 8 is a perspective view of the other contact piece; and Fig. 9 is a transverse section taken on line 9—9 in Fig. 3.

Similar letters of reference indicate corresponding parts in all the views.

The object of my invention is to provide a simple device for holding the safety fuse or thermal cut-out in the branch circuit in the position of use, and to provide a convenient cord adjuster for varying the length of the cord connected with the lamp or other translating device, the whole being comprised in a small, compact and practical device.

My invention consists in a casing, which in the present case is made in spindle-shape form, containing four pairs of contact plates, each pair of plates being adapted to clamp opposite ends of a fuse wire, and also to clamp the ends of a flexible cord and form good electrical connections between the flexible cord ends and the fuse wire. It also has diagonal key-shaped slots formed in the end of the case, for receiving the loop of the cord and clamping the same with sufficient friction to cause it to remain in any position in which it may be placed in the cord adjuster.

In carrying out my invention, I construct a casing A, having a cover B, the said casing being provided with two chambers $a$, $a'$, one for each conductor. The casing and its cover are made of any suitable material, such as porcelain, vulcanite, or any other insulating material which may be cast or molded into shape or cut out from the solid. It should also be incombustible. In the present case, the casing is formed from porcelain, with the chambers $a$ $a'$ molded and the key-shaped slots $b$ also molded in opposite ends of the casing. The partition $c$ which separates the chambers $a$ $a'$, is thickened at the middle of the casing, and provided with a transverse hole in which is inserted a female screw $d$, the inner end of which is made larger than the outer end, so that when a nut $e$ is turned on the threaded outer end of the screw $d$, the said screw will be clamped in its place in the body of the casing. The cover B is provided with a transverse hole $f$, through which passes a screw $g$, which is inserted in the screw $d$, and serves to clamp the cover B securely on the body of the casing and at the same time make good contact between the fuse wire and the conducting cord.

In opposite ends of each chamber $a$, $a'$, is placed a contact plate C, provided with arms $h$ projecting outwardly toward the cover B, and also furnished with a block or anvil $i$. In the end of each chamber is formed a recess $j$, for receiving the said block, and the opposite end of the contact plate C has, in the present case, a projection $k$, which extends into a hole in the body of the casing. The contact plate C is preferably made by folding together a narrow plate of conducting material, so that each arm $h$ consists of a fold of the metal, and the said arms are furnished with V-shaped slots $l$ for receiving the fuse wire $m$, also the bared end $n$ of the conducting cord D. The said conducting cord extends through a longitudinal hole in the block $i$, and through holes $o$ in two of the arms $h$, and is returned underneath the fuse wire $m$ in the narrower portions of the V-shaped slots, and the end of the cord rests upon the block $i$.

To the cover B are attached contact pieces E, formed preferably by bending strips of metal as in the other case, forming arms $p$, $p'$. The arms $p$ are furnished with slots $q$ in the edges thereof, and the arm $p'$ is provided with a slot $q'$ for receiving the fuse wire $m$, as indicated in dotted lines in Fig. 8. The contact plate E is provided with projections $r$, which are received in holes formed in the cover B.

There are two contact plates C in each chamber $a$, $a'$, that is, in each chamber oppositely arranged with respect to each other, the blocks $i$ lying outwardly, with their perforations opposite the perforations in the ends of the casing A, through which the branches of the flexible cord are inserted into the casing, and on the cover B are secured two pairs of contact plates E, the plates of each pair being oppositely arranged with respect to each other, and the contact plates E are arranged with reference to the casing A and cover B, so that the arms $p$, $p'$, will pass between the arms $h$ of the contact plates C, when the cutout is closed, thereby insuring a perfect contact between the fuse wire and the plate C and the bare end $n$ of the conducting cord. The outer terminal bend of the plate E forms a bearing surface $s$ for pressing the bare end $n$ of the cord which lies upon the block $i$.

The cord D is formed into a loop, as shown in Figs. 1 and 4, untwisted sufficiently to permit of inserting it in the narrower part of the key-shaped slot $b$, after which it is again twisted causing it to fill the round part of the key-shaped slot so as to retain its position therein. The cord may be pulled back and forth through the round part of the slot. By this means, the length of the cord may be adjusted as desired. A cord adjuster of this construction has double the capacity of a single cord adjuster, and in consequence is better adapted for longer reaches; and furthermore, the wear of the cord being divided between the two loops, will be much less than it would be if the adjustment were all done by means of a single loop.

My improved cut-out being placed in the middle portion of the cord and within reach, requires no ladder for its adjustment, and the replacing of a fuse requires neither tools nor special skill. The improved cut-out may with safety be put on a live line, as there is no possibility of bringing the two branches of the cord into contact, and as it is not necessary to use tools in making the connections, there is no danger of short circuiting in this way. The fuse wires are put in the contact plate E attached to the cover while it is removed from the vicinity of the line. When the cover is replaced the fuse is carried to its seat, and if blown, it can do no harm as it is entirely inclosed. In this improved cutout and adjuster, all the weight of the lamp shade and the cut-out itself is taken off from the points of connection of the wires with the fuses, so that the fastenings are all relieved of strain, and the cord is not liable to be broken.

In the drawings, I have shown the contact provided with arms formed of folds of the plate, but I do not limit or confine myself to this construction. I have also shown the body of the casing and the cover as provided with holes for receiving the projecting ends of the contact plates, but the contact plates may be secured in the position of use in other ways; as for example, by screws or rivets; neither do I limit myself to a spindle-shaped case, since in some instances a cylindrical, rectangular or other shape might be preferable.

Having thus described my invention, I claim as new and desire to secure by Letters Patent—

1. The combination in a safety fuse cut-out, of a comparted casing containing contact plates to which the conductor ends are attached, a cover carrying fuse-wire holders for bringing the fuse wires into actual contact with the conductor ends when the cover is on, and keyhole shaped slots in the outside of the casing, designed to hold the cord by frictional contact with the round parts of the slots, substantially as specified.

2. In a safety fuse cut-out, the combination of a contact plate provided with arms having V-shaped slots, and a contact plate having arms slotted at the edge and end thereof, for receiving the fuse wire to be pressed into the V-shaped slots of the arms of the opposite plate, substantially as specified.

3. In a safety fuse cut-out, the combination of a plate provided with arms having V-shaped slots and furnished with a perforated block for receiving a cord, a plate furnished with slotted arms for receiving the fuse wire, and provided with a bearing surface for clamping the fuse wire and the conducting cord, substantially as specified.

4. In a safety fuse cut-out, the combination of a comparted casing A, provided with two pairs of contact plates C having V-shaped slots, a cover B furnished with contact plates E having slotted arms and adapted to carry the fuse wire, and means, substantially as described, for fastening the contact plates C, E, in the casing A and cover B, as specified.

5. In a combined cut-out and cord adjuster, a casing provided with a cover, the said casing and cover being furnished with holes for receiving the ends of contact plates, and contact plates furnished with projecting end pieces for inserting in the said holes in the cover and body of the casing, whereby the contact pieces may at any time be inserted in the casing or removed therefrom without the use of screws or other fastenings requiring tools for manipulating them, substantially as specified.

6. A contact plate for an electric cut-out, having projecting arms for holding the conductor ends and fuse wires, the said arms being formed of folds of the plate, substantially as specified.

7. In a combined cut-out and cord adjuster, the combination, of the casing A provided with the chambers $a$, $a'$, and key-slots $b$, the cover B fitted to the casing, the double cord D having its branches inserted in holes in the ends of the casing, the contact plates C, E, the fuse wires $m$, and the fastening screw $g$, substantially as specified.

EDGAR DAY KNAP.

Witnesses:
 GEO. M. HOPKINS,
 C. SEDGWICK.